US008879854B2

(12) United States Patent
Velusamy et al.

(10) Patent No.: US 8,879,854 B2
(45) Date of Patent: Nov. 4, 2014

(54) METHOD AND APPARATUS FOR RECOGNIZING AN EMOTION OF AN INDIVIDUAL BASED ON FACIAL ACTION UNITS

(75) Inventors: Sudha Velusamy, Bangalore (IN); Hariprasad Kannan, Bangalore (IN); Balasubramanian Anand, Bangalore (IN); Anshul Sharma, Bangalore (IN)

(73) Assignee: Samsung Electronics Co., Ltd (KR)

( * ) Notice: Subject to any disclaimer, the term of this patent is extended or adjusted under 35 U.S.C. 154(b) by 375 days.

(21) Appl. No.: 13/278,658

(22) Filed: Oct. 21, 2011

(65) Prior Publication Data

US 2012/0101735 A1 Apr. 26, 2012

(30) Foreign Application Priority Data

Oct. 21, 2010 (IN) ............ 3108/CHE/2010

(51) Int. Cl.
*G06K 9/62* (2006.01)
*G06K 9/00* (2006.01)
(52) U.S. Cl.
CPC ........ *G06K 9/00315* (2013.01); *G06K 9/00302* (2013.01)
USPC ........... 382/224; 382/100; 382/160; 382/181; 382/227; 382/228
(58) Field of Classification Search
CPC .......... G06K 9/00302; G06K 9/00308; G06K 9/00315
USPC ......... 382/100, 115, 118, 155, 159, 160, 181, 382/224, 227, 228
See application file for complete search history.

(56) References Cited

U.S. PATENT DOCUMENTS

| | | | |
|---|---|---|---|
| 7,930,199 B1* | 4/2011 | Hill | 382/118 |
| 8,401,248 B1* | 3/2013 | Moon et al. | 382/118 |
| 2006/0115157 A1* | 6/2006 | Mori et al. | 382/190 |
| 2006/0192785 A1 | 8/2006 | Marschner et al. | |
| 2009/0153554 A1 | 6/2009 | Lim et al. | |
| 2009/0285456 A1* | 11/2009 | Moon et al. | 382/118 |
| 2010/0182325 A1 | 7/2010 | Cederwall et al. | |
| 2011/0007174 A1* | 1/2011 | Bacivarov et al. | 348/222.1 |
| 2011/0038547 A1* | 2/2011 | Hill | 382/195 |

FOREIGN PATENT DOCUMENTS

KR 1020040007921 1/2004

OTHER PUBLICATIONS

M. Pantic and L. J. M. Rothkrantz, "Expert System for Automatic Analysis of Facial Expressions", Image and Vision Computing, vol. 18, Issue 11, Aug. 2000, pp. 881-905.*

(Continued)

*Primary Examiner* — Eric Rush
(74) *Attorney, Agent, or Firm* — The Farrell Law Firm, P.C.

(57) ABSTRACT

An apparatus and method are provided for recognizing an emotion of an individual based on Action Units. The method includes receiving an input AU string including one or more AUs that represents a facial expression of an individual from an AU detector; matching the input AU string with each of a plurality of AU strings, wherein each of the plurality of AU strings includes a set of highly discriminative AUs, each representing an emotion; identifying an AU string from the plurality of AU strings that best matches the input AU string; and outputting an emotion label corresponding to the best matching AU string that indicates the emotion of the individual.

18 Claims, 4 Drawing Sheets

(56) References Cited

OTHER PUBLICATIONS

Irene Kotsia and Ioannis Pitas, "Facial Expression Recognition in Image Sequences Using Geometric Deformation Features and Support Vector Machines", IEEE Transactions on Image Processing, vol. 16, No. 1, Jan. 2007, pp. 172-187.*

Yongmian Zhang and Qiang Ji, "Active and Dynamic Information Fusion for Facial Expression Understanding From Image Sequences", IEEE Transactions on Pattern Analysis and Machine Intelligence, vol. 27, No. 5, May 2005, pp. 699-714.*

* cited by examiner

METHOD AND APPARATUS FOR RECOGNIZING AN EMOTION OF AN INDIVIDUAL BASED ON FACIAL ACTION UNITS

PRIORITY

This application claims priority under 35 U.S.C. §119(a) to an Indian Patent Provisional filed in the Indian Intellectual Property Office on Oct. 21, 2010 and assigned Serial No. 3108/CHE/2010, the entire disclosure of which is hereby incorporated by reference.

BACKGROUND OF THE INVENTION

1. Field of the Invention

The present invention relates generally to the field of facial expression recognition, and more particularly, to a method and an apparatus for recognizing an emotion of an individual using facial Action Units (AUs).

2. Description of the Related Art

In life, people often express emotions through facial expressions. Facial expressions are some of the most powerful, natural, and immediate ways for humans to communicate their emotions and intentions. The face can express an emotion sooner than people verbalize or even realize their feelings. For example, different emotions are expressed using various facial regions, mainly the mouth, the eyes, and the eyebrows.

More often, emotional expression is communicated by subtle changes in one or a few discrete facial features, such as a tightening of the lips in anger or obliquely opening the lip corners in sadness. Many computer systems are configured to recognize a small set of prototypic emotional expressions, e.g., joy, surprise, anger, sadness, fear, and disgust.

A Facial Action Coding System (FACS) has been developed for describing facial expressions by AUs. Of the 44 FACS AUs defined in the FACS, 30 AUs are anatomically related to contractions of specific facial muscles, i.e., 12 are for upper face, and 18 are for lower face. AUs can occur either singly or in combination. When AUs occur in combination, they may be additive, in which the combination does not change the appearance of the constituent Aus, or non-additive, in which the appearance of the constituents does change.

As an example of a non-additive effect, AU 4 appears differently depending on whether it occurs alone or in combination with AU 1 (as in AU 1+4). When AU 4 occurs alone, the brows are drawn together and lowered. In AU 1+4, the brows are drawn together but are raised due to the action of AU 1. AU 1+2 is another example of non-additive combinations. When AU 2 occurs alone, it not only raises the outer brow, but also often pulls up the inner brow, which results in a very similar appearance to AU 1+2. These effects of the non-additive AU combinations increase the difficulties of AU recognition.

Current systems generally adopt a single phase method or two phase method for recognizing facial expressions using AUs. The two phase method is more practical in analyzing emotions than the single phase method. In the two phase method, a set of action units describing a facial expression of an individual in an image or a video frame is detected. The set of action units are then mapped to one or more target emotions to recognize an actual emotion of the individual. Typically, the two phase method uses formulated mapping rules for mapping a set of action units to target emotions. The formulated mapping rules are based on an Emotional Facial Action Coding System and are sensitive to noise in the input.

However, the two phase method fails to compensate for weaknesses in the current AU detection techniques.

Currently known AU detection methods suffer from errors due to certainty in accurately tracking a facial expression and extracting features from the facial expression. When such erroneous action units are fed for mapping with target emotions using the two phase method, the accuracy of the final emotion recognized based on the erroneous action units often deteriorates.

SUMMARY OF THE INVENTION

Accordingly, the present invention is made to address at least the above-described problems described above and to provide at least the advantages described below.

In accordance with an aspect of the present invention, a method is provided for recognizing an emotion of an individual based on AUs. The method includes receiving an input AU string including one or more AUs that represents a facial expression of an individual from an AU detector, matching the input AU string with each of a plurality of AU strings, wherein each of the plurality of AU strings includes a set of highly discriminative AUs, each representing an emotion, identifying an AU string from the plurality of AU strings that best matches the input AU string, and outputting an emotion label corresponding to the best matching AU string that indicates the emotion of the individual.

In accordance with another aspect of the present invention, an apparatus is provided for recognizing an emotion of an individual based on AUs. The apparatus includes a processor; and a memory coupled to the processor. The memory includes instructions stored therein, that when executed by the processor, cause the processor to receive an input AU string including one or more AUs that represents a facial expression of the individual; match the input AU string with each of a plurality of AU strings, wherein each of the plurality of AU strings includes a set of highly discriminative AUs, each representing an emotion; identify an AU string from the plurality of AU strings that best matches the input AU string; and output an emotion label corresponding to the best matching AU string that indicates the emotion of the individual.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, the terms "facial AUs" and "AUs" are used interchangeably.

To map AUs detected from a face of an individual to target emotions, a relation matrix is formed based on discriminative power of AUs with respect to each of the target emotions. Discriminative power is a value that helps determine statistical relationship between each action unit and one or more emotions. For example, a high discriminative power indicates that the action unit belongs to an emotion, more than the action unit with a low discriminative power. The relation matrix is used for mapping an input AU string with a number of template AU strings selected from the relation matrix to recognize an emotion of an individual, according to an embodiment of the present invention.

Figure 1:
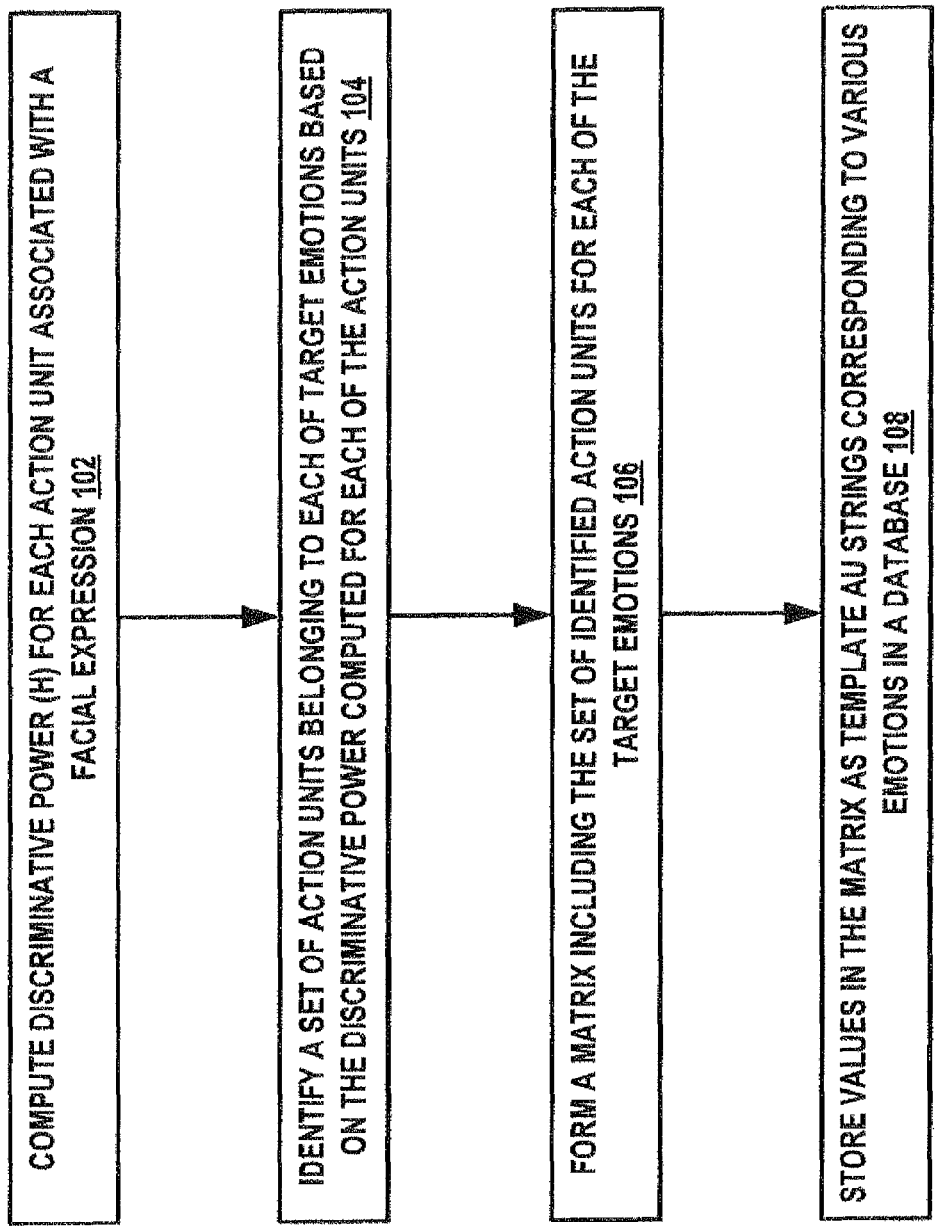
FIG. 1 is a flowchart illustrating a method of forming a relation matrix indicating statistical relationship between a set of AUs and an emotion, according to an embodiment of the present invention.

FIG. 1 is a flowchart illustrating a method of forming a relation matrix indicating statistical relationship between a set of AUs and an emotion, according to an embodiment of the present invention.

Referring to FIG. 1, in step 102, discriminative power (H) is computed for each AU associated with a facial expression. Discriminative power (H) is a value whose magnitude quantifies discriminative power of AUs associated with facial actions for an emotion. Thus, the discriminative power enables identification of highly discriminative facial actions for various emotions using statistical data. Statistical data relates to probabilities/statistics of correlations between various emotions and AUs derived from a large set of facial expressions. In accordance with an embodiment of the present invention, the discriminative power (H) for each AU is computed based on Equation (1)

$$H = P(Y_j | X_i) - P(Y_j | \overline{X}_i)/\text{NormFactor} \quad (1)$$

In Equation (1), $P(Y_j | X_i)$ is the probability of action unit Yj, given that the emotion Xi has occurred, and $P(Y_j | \overline{X}_i)$ is the probability of action unit Yj, given that the emotion Xi has not occurred.

Figure 3:
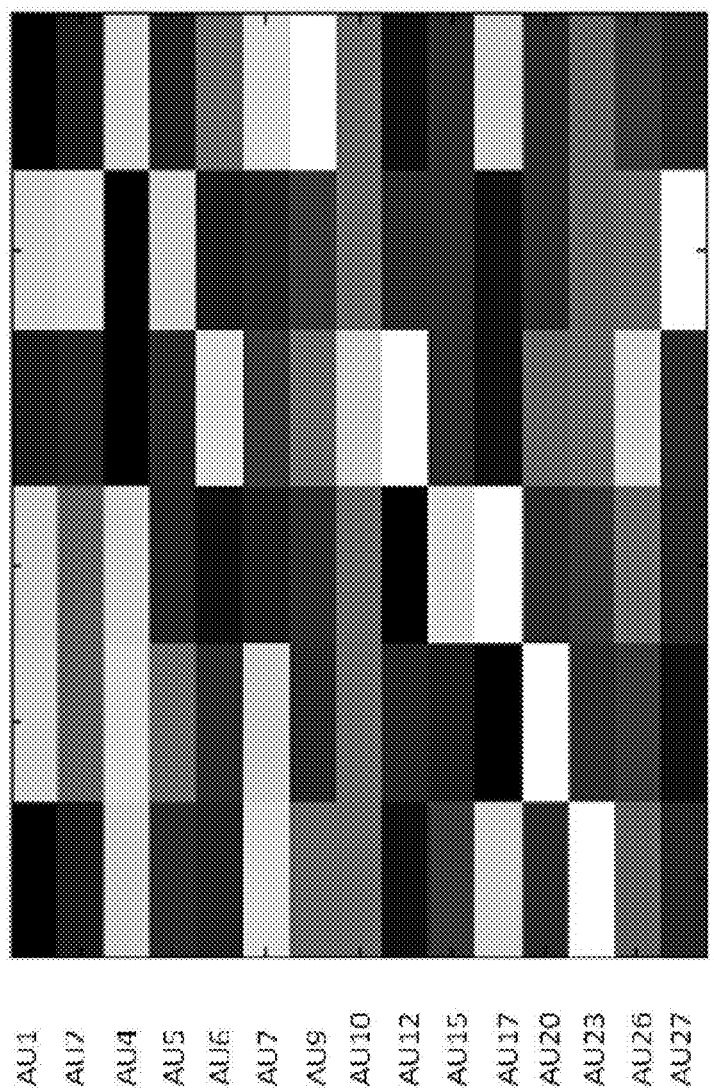
FIG. 3 is a pictorial representation of discriminative power of action units for six emotions, according to an embodiment of the present invention.

Using the H values, a relation matrix is formed to represent statistical relationship between each AU and six emotions, as illustrated in FIG. 3. The values in the relation matrix [H] are then normalized to suppress learning sample size for each emotion. Herein, the discriminative power is computed for action units, which are based on the Facial Action Coding System.

In step 104, a set of AUs belonging to each of target emotions are identified from the relation matrix, based on the discriminative power computed for each of the AUs. In accordance with an embodiment of the present invention, highly discriminative AUs, which have a high probability of belonging to a particular emotion, are identified from the relation matrix. That is, the highly discriminative AUs have high discriminative power compared to other AUs and therefore, are considered as representing a particular emotion.

FIG. 3 is a pictorial representation of discriminative power of action units for six emotions, according to an embodiment of the present invention.

Referring to FIG. 3, positive intensity a lighter color) indicates high probability of an action unit belonging to a particular emotion, while negative intensity (a darker color) indicates high probability of an action unit not belonging to a particular emotion. For example, the emotion "happy" has AU 12, AU 6, and AU 26, which are positive discriminative AUs, and AU 1, AU 2, and AU 5, which are negative discriminative AUs.

In step 106, a matrix is derived from the relation matrix based on the identified set of highly discriminative action units for each of the target emotions. An example of a matrix including five highly discriminative action units selected for six emotions, i.e., angry, fear, sad, happy, surprise, and disgust is shown in Table 1 below.

TABLE 1

| EMOTION LABEL | ACTION UNITS | | | | |
|---|---|---|---|---|---|
| ANGRY | 23 | 7 | 17 | 4 | 10 |
| FEAR | 20 | 4 | 1 | 7 | 5 |
| SAD | 17 | 15 | 4 | 1 | 10 |
| HAPPY | 12 | 6 | 26 | 10 | 23 |
| SURPRISE | 27 | 2 | 1 | 5 | 26 |
| DISGUST | 9 | 7 | 4 | 17 | 6 |

In Table 1, for example, the emotion "angry" has AU 23, AU 7, AU 17, AU 4, and AU 10 as highly discriminative AUs, and "happy" has AU 12, AU 6, AU 26, AU 10, and AU 23 as highly discriminative action units. The matrix in Table 1 helps efficiently map an input AU string to one or more AU strings corresponding to six emotions for recognizing an emotion of an individual based on detected facial expressions, as will be described below in more detail with reference to FIG. 2.

In step 108, set of AUs corresponding to various emotions in the matrix is stored as template AU strings in a database. For example, {12 6 26 10 23} form a template AU string for "happy" and {23 7 17 4 10} form a template string for "angry".

Figure 2:
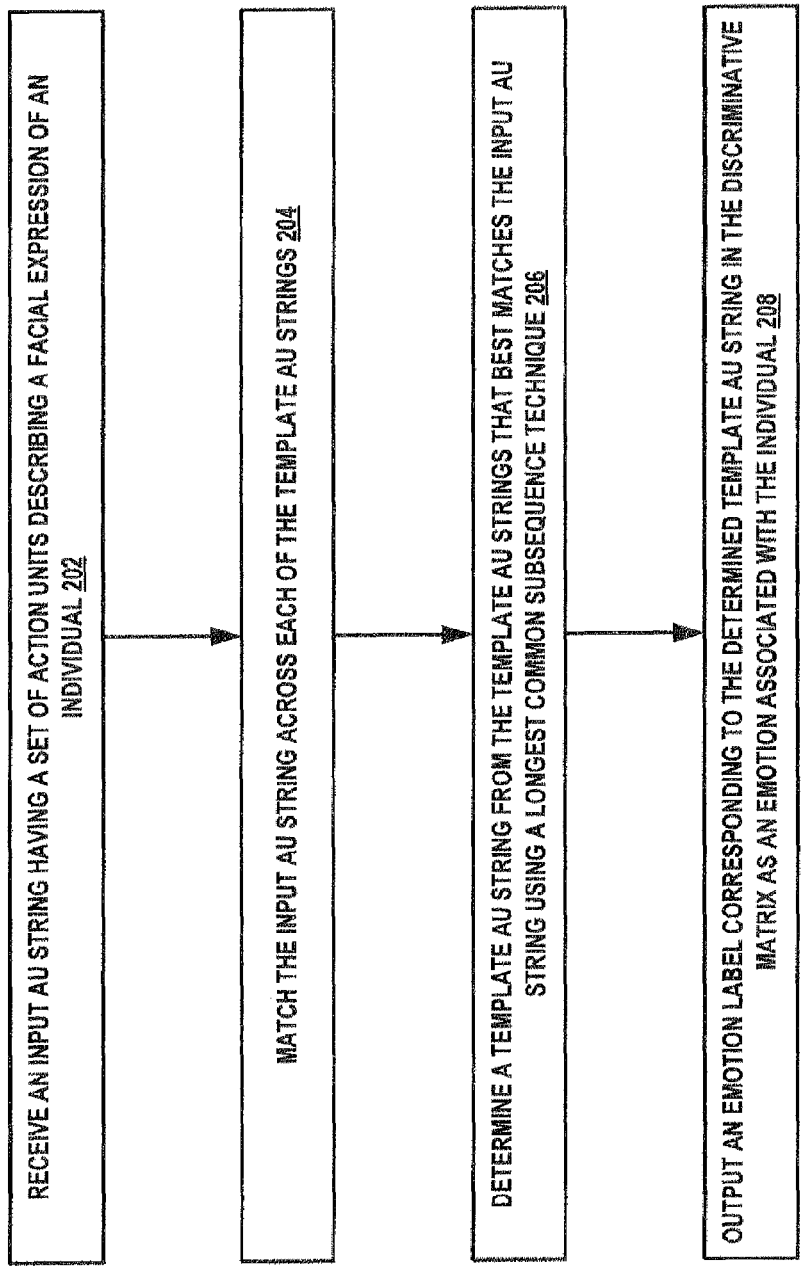
FIG. 2 is a flowchart illustrating a method of recognizing an emotion by mapping an input AU string to each template AU string, according to an embodiment of the present invention.

FIG. 2 is a flowchart illustrating a method of recognizing an emotion by mapping an input AU string to each stored template AU string, according to an embodiment of the present invention.

Referring to FIG. 2, in step 202, an input AU string having a set of AUs describing a facial expression of an individual (derived from an image or a video frame) is received from an automatic AU detection module. As described above, the input AU string is often prone to errors due to uncertainty in tracking facial expressions and extraction of features from the individual face. For example, some AUs describing facial expression may be missing in the input AU string while some AUs may be erroneously inserted in the input AU string due to deficiencies in the automatic AU detection module. Steps 204-208 describe a manner in which erroneous input AU strings can be handled to correctly identify emotions of individuals.

Specifically, in step 204, the input AU string is matched across the template AU strings in the matrix formed in step 106. In step 206, a template AU string from the template AU strings that best matches the input AU string is determined using a longest common subsequence technique. The longest common subsequence technique is an approximate string matching technique indicating a greatest amount of similarity between the input AU string and one of the template AU strings. Thus, the longest common subsequence technique helps determine a template AU string having minimal matching cost against the input AU string as compared to remaining template AU strings.

In accordance with an embodiment of the present invention, a common subsequence is determined by matching the input AU string with each of the template AU strings. The common subsequence is indicative of a distance measure of an amount of similarity between the input AU string and the template AU strings. Based on the common subsequence, a longest common subsequence associated with an AU string best matching the input AU string is identified. In the longest common subsequence, a subsequence is a sequence in which AUs appears in a same relative order but are not necessarily contiguous. Additionally, the longest common subsequence technique allows insertion and deletion of AUs in the input AU string, but not substitution of AUs.

Accordingly, in step 208, an emotion label corresponding to the determined template AU string is output as an emotion associated with the individual. For example, if the input AU string is {4 6 12 17 26}, the input AU string best matches with the template AU string {12 6 26 10 23}, which corresponds to an emotion label "happy", as shown in Table 1. In this example, the input AU string includes erroneous AUs like 4, and 17. However, because the longest common subsequence technique allows for insertion of erroneous action units in the input AU string, the erroneous input AU string can be accurately mapped to the template AU string {6, 10, 12, 23, 26} to recognize that the individual is happy. Likewise, deletion becomes important to map the input AU strings like {12}, {6, 12}, {6, 12, 26} to happy as all of theses AUs indicate happy.

Similarly, non-allowance of substitution helps match an input AU string with more than one template AU strings. For example, the input AU string {4, 6, 12, 17, 26} can get matched with the template AU string {1, 4, 10, 15, 17} that corresponds to emotion label "sad" and the template AU string {4, 6, 7, 9, 17} corresponding to emotion label "disgust" with the same replacement cost of 3.

Figure 4:
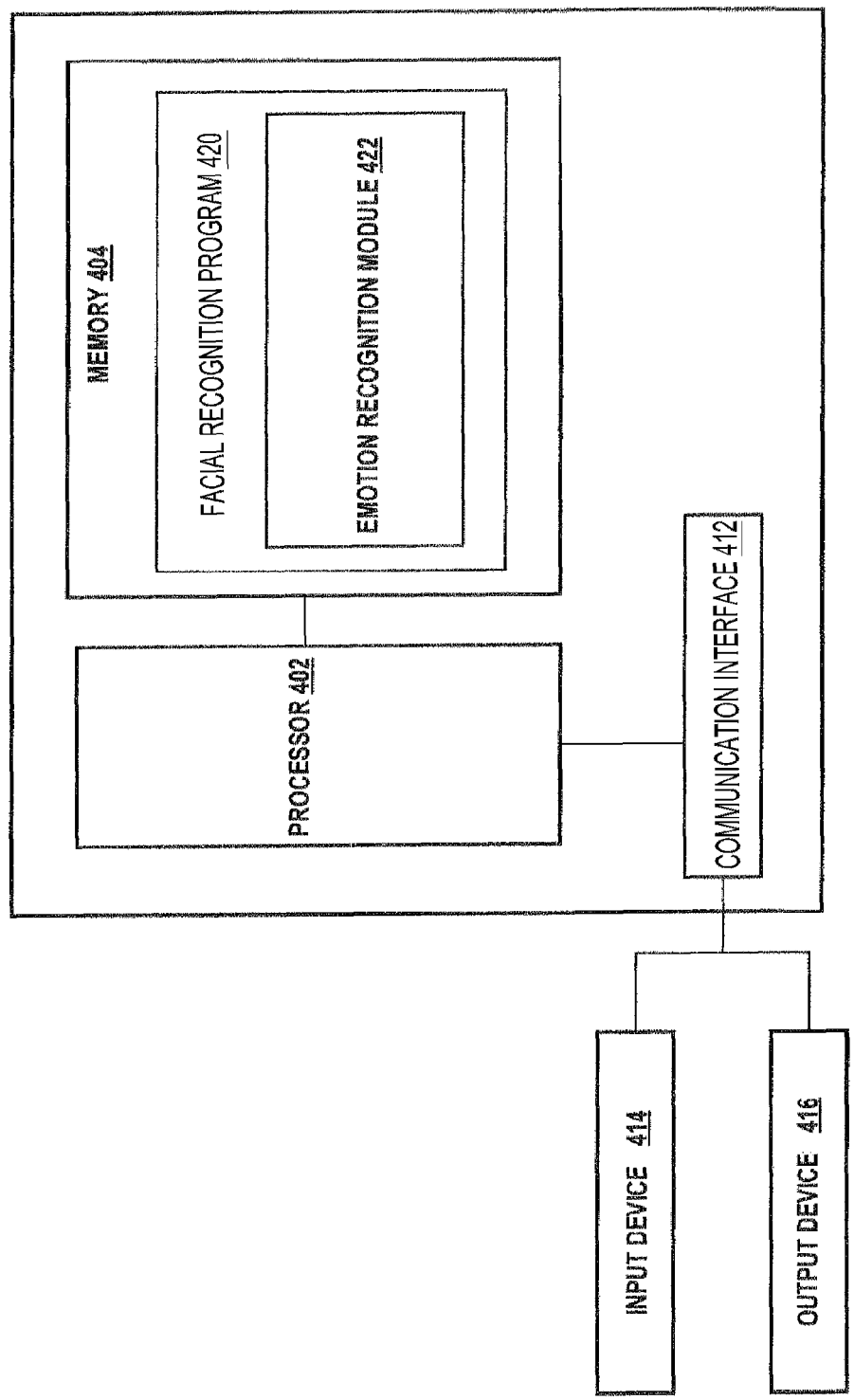
FIG. 4 illustrates an apparatus for recognizing an emotion of an individual using facial AUs, according to an embodiment of the present invention.

FIG. 4 illustrates an apparatus for recognizing an emotion of an individual using facial AUs, according to an embodiment of the present invention. Examples of the apparatus include a Personal Computer (PC), a Tablet PC, a mobile phone, etc.

Referring to FIG. 4, the apparatus includes a processor 402, a memory 404, and a communication interface 412. The communication interface 412 connects the apparatus to other networks or devices, e.g., a wireless communication network such as wireless local area network, local area network, etc. and an AU detector (not shown) for providing an AU string including one or more action units that represents a facial expression of an individual.

The apparatus also includes a user input device 414 and an output device 416. For example, the user input devices 414 may be a keyboard, mouse, etc, and the output device 416 may be a display, printer, etc. Additionally, while FIG. 4 illustrates the user input device 414 and the output device 416 being physically separated from the other components of the apparatus, i.e., communicating through the communication interface 412, the user input device 414 and the output device 416 could being physically included with the other components, e.g., a touch screen display, which acts as both the user input device 414 and the output device 416, in a tablet PC.

The memory 404 may include volatile memory and non-volatile memory. A variety of computer-readable storage media may be stored in and accessed from the memory elements of the apparatus. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, etc.

The processor 402, as used herein, is any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, etc.

Further, the above-described embodiments of the present invention may be implemented in conjunction with program modules, including functions, procedures, data structures, and application programs, for performing tasks, or defining abstract data types or low-level hardware contexts.

Machine-readable instructions stored on any of the above-mentioned storage media are executable by the processor 402 of the apparatus. For example, a facial recognition program 420 includes machine-readable instructions capable of recognizing emotions based on facial AUs, as described above.

In accordance with an embodiment of the present invention, the facial recognition program 420 includes an emotion recognition module 422 for recognizing emotions of individuals based on facial AUs, as described above in conjunction with FIGS. 1 and 2. For example, the facial recognition program 420 may be included on a Compact Disk-Read Only Memory (CD-ROM) and/or loaded from the CD-ROM to a hard drive in the memory 404. The machine-readable instructions cause the apparatus to encode according to the various embodiments of the present invention.

Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for recognizing an emotion of an individual based on Action Units (AUs), the method comprising:
   receiving an input AU string including one or more AUs that represents a facial expression of an individual from an AU detector;
   comparing the input AU string with each of a plurality of AU strings, each of the plurality of AU strings includes a set of a same number of AUs that are most discriminative of a respective one of a plurality of emotions;
   identifying an AU string from the plurality of AU strings that best matches the input AU string; and
   outputting an emotion label corresponding to the best matching AU string that indicates the emotion of the individual.

2. The method of claim 1, wherein identifying the AU string from the plurality of AU strings that best matches the input AU string comprises:
   determining a common subsequence between the input AU string and each of the plurality of AU strings; and identifying a longest common subsequence from the determined common sub-sequences,
wherein the longest common subsequence is indicative of a greatest amount of similarity between the input AU string and one of the plurality of AU strings.

3. The method of claim 2, wherein the common subsequence is indicative of a distance measure of an amount of similarity between the input AU string and each of the plurality of AU strings.

4. The method of claim 1, further comprising:
determining a discriminative power for each of a plurality of AUs based on statistical data;
selecting a set of AUs representing each of a plurality of emotion labels, based on the discriminative power for each of the plurality of AUs; and
storing the selected set of AUs associated with each of the plurality of emotion labels as AU strings.

5. The method of claim 4, wherein the selected set of AUs associated with each of the plurality of emotion labels is stored as the AU strings in a matrix.

6. The method of claim 4, wherein the discriminative power for each of the plurality of AUs indicates a probability of each AU belonging to one of the plurality of emotion labels.

7. An apparatus for recognizing an emotion of an individual using Action Units (AUs), the apparatus comprising:
a processor; and
a memory coupled to the processor,
wherein the memory includes instructions stored therein, that when executed by the processor, cause the processor to:
receive an input AU string including one or more AUs that represents a facial expression of the individual;
match the input AU string with each of a plurality of AU strings, each of the plurality of AU strings comprising a set of a same number of AUs that are most discriminative of a respective one of a plurality of emotions;
identify an AU string from the plurality of AU strings that best matches the input AU string; and
output an emotion label corresponding to the best matching AU string that indicates the emotion of the individual.

8. The apparatus of claim 7, wherein in identifying the AU string from the plurality of AU strings that best matches the input AU string, the processor:
determines a common subsequence between the input AU string and each of the plurality of AU strings; and
identifies a longest common subsequence from the determined common sub-sequences,
wherein the longest common subsequence is indicative of a greatest amount of similarity between the input AU string and one of the plurality of AU strings.

9. The apparatus of claim 8, wherein the common subsequence is indicative of a distance measure of an amount of similarity between the input AU string and each of the plurality of AU strings.

10. The apparatus of claim 7, wherein the processor:
determines a discriminative power for each of a plurality of AUs based on statistical data;
selects a set of AUs representing each of a plurality of emotion labels, based on the discriminative power for each of the plurality of AUs; and
stores the selected set of AUs associated with each of the plurality of emotion labels as AU strings.

11. The apparatus of claim 10, wherein the selected set of AUs associated with each of the plurality of emotion labels are stored as the AU strings in a matrix.

12. The apparatus of claim 10, wherein the discriminative power for each of the plurality of AUs indicates a probability of each AU belonging to one of the plurality of emotion labels.

13. A non-transitory computer readable storage medium having instructions stored therein, that when executed by a processor, result in performing a method for recognizing an emotion of an individual based on Action Units (AUs), the method comprising:
receiving an input AU string including one or more AUs that represents a facial expression of an individual from an AU detector;
matching the input AU string with each of a plurality of AU strings, each of the plurality of AU strings comprising a set of a same number of AUs that are most discriminative of a respective one of a plurality of emotions;
identifying an AU string from the plurality of AU strings that best matches the input AU string; and
outputting an emotion label corresponding to the best matching AU string that indicates the emotion of the individual.

14. The storage medium of claim 13, wherein identifying the AU string from the plurality of AU strings that best matches the input AU string comprises:
determining a common subsequence between the input AU string and each of the plurality of AU strings; and
identifying a longest common subsequence from the determined common sub-sequences,
wherein the longest common subsequence is indicative of a greatest amount of similarity between the input AU string and one of the plurality of AU strings.

15. The storage of claim 14, wherein the common subsequence is indicative of a distance measure of an amount of similarity between the input AU string and each of the plurality of AU strings.

16. The storage of claim 13, wherein the method further comprises:
determining a discriminative power for each of a plurality of AUs based on statistical data;
selecting a set of AUs representing each of a plurality of emotion labels, based on the discriminative power for each of the plurality of AUs; and
storing the selected set of AUs associated with each of the plurality of emotion labels as AU strings.

17. The storage medium of claim 16, wherein the discriminative power for each of the plurality of AUs indicates a probability of each AU belonging to one of the plurality of emotion labels.

18. The storage medium of claim 16, wherein the selected set of AUs associated with each of the plurality of emotion labels is stored as the AU strings in a matrix.

* * * * *